United States Patent
Jayapalan et al.

(10) Patent No.: US 8,532,093 B2
(45) Date of Patent: *Sep. 10, 2013

(54) VOICE OVER INTERNET PROTOCOL MARKER INSERTION

(75) Inventors: Vijay Jayapalan, Irving, TX (US); Mike Metaxas, Oakland Gardens, NY (US); Sundar Padmanabhan, Irving, TX (US); Manvinder Chopra, Carrollton, TX (US); Jim Bartlett, Santa Barbara, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 438 days.

This patent is subject to a terminal disclaimer.

(21) Appl. No.: 12/784,601

(22) Filed: May 21, 2010

(65) Prior Publication Data
US 2010/0226365 A1    Sep. 9, 2010

Related U.S. Application Data

(63) Continuation of application No. 11/864,117, filed on Sep. 28, 2007, now Pat. No. 7,751,450.

(51) Int. Cl.
*H04L 12/66*    (2006.01)

(52) U.S. Cl.
USPC ............................ 370/352; 370/525; 713/176

(58) Field of Classification Search
USPC ................. 370/525–529, 465–466, 493, 495, 370/352–356; 713/168, 170, 172–173, 175–176
See application file for complete search history.

(56) References Cited

U.S. PATENT DOCUMENTS

| | | | | |
|---|---|---|---|---|
| 7,152,161 B2* | 12/2006 | Bruekers et al. | ............ | 713/176 |
| 7,188,248 B2* | 3/2007 | Watson | ........................ | 713/176 |
| 7,298,733 B2* | 11/2007 | Sakai et al. | .................... | 370/352 |
| 7,460,684 B2* | 12/2008 | Srinivasan | .................... | 382/100 |
| 7,602,936 B2* | 10/2009 | Wendt | .......................... | 382/100 |
| 7,751,450 B2* | 7/2010 | Metaxas et al. | ............... | 370/528 |
| 7,944,817 B1* | 5/2011 | Sylvain | ........................ | 370/228 |
| 2003/0130864 A1 | 7/2003 | Ho et al. | | |
| 2003/0154073 A1 | 8/2003 | Ota et al. | | |
| 2003/0158730 A1 | 8/2003 | Ota et al. | | |
| 2004/0057424 A1* | 3/2004 | Kokkonen | ..................... | 370/352 |
| 2006/0034266 A1 | 2/2006 | Harris et al. | | |
| 2006/0133359 A1* | 6/2006 | McCormack et al. | ........ | 370/352 |
| 2006/0200672 A1 | 9/2006 | Calhoon et al. | | |
| 2006/0285501 A1 | 12/2006 | Damm | | |
| 2007/0019621 A1* | 1/2007 | Perry et al. | .................... | 370/352 |
| 2007/0064681 A1* | 3/2007 | Boillot et al. | ................. | 370/352 |
| 2007/0250715 A1 | 10/2007 | Cai et al. | | |
| 2008/0016358 A1 | 1/2008 | Filreis et al. | | |
| 2008/0021884 A1 | 1/2008 | Jones et al. | | |
| 2008/0229110 A1 | 9/2008 | Balfanz et al. | | |
| 2008/0244686 A1 | 10/2008 | Li et al. | | |

(Continued)

*Primary Examiner* — Kevin Mew (57) ABSTRACT

A watermark is inserted or overwritten into a packetized voice stream in a VoIP environment to characterize the voice data stream for various functions, such as providing certain in-band audible information or markers for detection. A visual type of marker can be inserted to measure delay for various applications, such as the round trip delay associated with providing directory assistance services, including measuring the delay from providing a prompt to a caller to the their response. The visual marker facilitates use of processes to detect measuring points for measuring delays. Audible markers can be used to provide various types of audible signals, including informational tones to agents, as well as announcements to callers.

20 Claims, 5 Drawing Sheets

(56) References Cited

U.S. PATENT DOCUMENTS

| | | |
|---|---|---|
| 2009/0103449 A1 | 4/2009 | Claise et al. |
| 2009/0129571 A1 | 5/2009 | Altberg et al. |
| 2009/0132825 A1 | 5/2009 | Mohanty |
| 2011/0167349 A1* | 7/2011 | Samra et al. .................. 715/716 |
| 2012/0158550 A1* | 6/2012 | Rhoads ........................ 705/27.1 |

* cited by examiner

VOICE OVER INTERNET PROTOCOL MARKER INSERTION

RELATED APPLICATION

This application is a continuation of U.S. patent application Ser. No. 11/864,117, filed Sep. 28, 2007, which is incorporated herein by reference.

BACKGROUND

The disclosure generally pertains to watermarking voice packets in a Voice-over-IP ("VoIP") environment for various purposes, including measuring delay of information transfer in a communications network and providing audible information, including informational tones and announcements.

In various telecommunications applications, such as calls involving operator services, it is desirable to manipulate speech flows in various ways, for various purposes, including measuring delays between certain speech related events. Measuring speech delay is an important aspect of engineering a voice network, as excessive delay can lead to customer frustration and to a perception of poor customer service by the caller. For calls involving traditional circuit switched technology (referred to herein as "PSTN"), measuring such delay is well established for various applications, but such techniques are not readily transferable to a VoIP environment, which uses a fundamentally different underlying technology. Thus, there is a need for a simplified and easy to use system and method for measuring delay for voice-based calls involving VoIP calls involving a caller and an agent, including where the caller is associated with traditional circuit switched technologies.

Further, in VoIP environments, various audible information is required to be inserted at different times, associated with the provision of certain operator services. For example, calls received by agents may require an indication that a caller is now available on-line. This indication can be provided by inserting a brief audible informational tone to the agent. The use of traditional circuit switched technologies for providing such information tones and announcement is not readily transferable to a VoIP environment. Thus, there is a need for a simplified and easy to use system for inserting audible markers for voice based calls involving VoIP technologies.

BRIEF DESCRIPTION OF THE SEVERAL VIEWS OF THE DRAWING(S)

Reference will now be made to the accompanying drawings, which are not necessarily drawn to scale, and which illustrate various embodiments of the invention, wherein.

DETAILED DESCRIPTION OF THE PREFERRED EMBODIMENT

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

In telecommunications environments, it is desirable to be able to measure the delay of transferring information from an input point where information is provided at a first point, to where information (or a response thereto) is played out at a destination point. For traditional circuit switched networks, various mechanisms have been created and are known for measuring delay, including speech delay. In speech networks, voice delay is an important parameter for various reasons. One such reason is that human factors studies have shown that people will tolerate a certain maximum delay with speech. After a certain time threshold, the delay becomes distracting and irritating. While many data applications can tolerate some delay, human interaction involving speech is fairly sensitive to delays over 250-350 milliseconds, and 500 or more milliseconds is very noticeable. Further, in some applications, such as when a caller desires to interact with an agent (e.g., an operator), excessive delay can reduce the operator's efficiency and lead to a poorer perception of customer service by the caller.

Thus, it is desirable to know the delay for information transfer, particularly speech, in a communications network. Knowing the delay allows engineering personnel to adjust the network to provide optimum service to callers. In order to do so, it is necessary to first quantify the delay, by measuring its value.

In addition, it is also desirable at certain times in telecommunications networks to overwrite audible sounds present on a speech connection, by inserting either informational tones or sounds characterized as 'beeps' or such. In some embodiments, these sounds are used to indicate certain information to the caller, such as a prompt, or that the conversation is being recorded.

In other embodiments, the informational tone may be provided to an agent or operator, who is participating on the call in order to provide the requested operator service. For example, in some embodiments, a certain tone may be provided to an agent indicating that a caller is now connected. This is required because in many modern digital environments, operators or agents are not always on-line during all phases of a call. Specifically, the operator is not on-line when the call is initially answered or dialed. Thus, the operator does not hear the phases of a call comprising ringing, followed by an answer (which is often detected by a clicking sound). Rather, many modern call handling systems will automatically answer (or dial) calls, and connect an available operator with a caller. Because of the nature of these digital systems, there is no "click" indicating when a caller is connected. This could lead to the undesirable, and unproductive situation, where the caller and the agent are both connected to each other, but do not know it. Because of the silence, the parties may be waiting, or alternatively, the agent may be asking questions when the caller is not yet connected. This would lead to the caller hearing a clipped sentence, or the caller hearing a long silence before the operator begins talking. Thus, providing informational tones of various types, can indicate to the agent when a caller is available or the nature of their call. Typically, these information signals are provided only to one party (e.g., the operator), so that the other party does not hear them.

In other embodiments, it is also desirable to overwrite or insert sounds indicating an announcement of some sort. In many telecommunications services, a greeting announcement is provided to the caller. For example, in dialing certain information services, an announcement will welcome the caller to the service provider's information service. These announcements are not provided by a live agent, but are prerecorded. In some embodiments, only the caller hears the announcements whereas in other embodiments, the caller and agent may hear them. For example, in providing directory assistance, it is common to provide an introductory greeting followed by a prompt to the caller to say the desired city and state associated with the listing that is being requested. Requiring a directory assistance operator to repeatedly state the greeting and the prompt is taxing on the operator, and thus these announcements are usually provided by automated systems.

For communication networks involving voice over IP ("VoIP"), the traditional methods of voice measurement as well as the methods of providing announcements or informational tones are not always readily transferable or applicable. VoIP involves the packetization of digitized voice data, and certain requirements are imposed on equipment in processing the packets, based on the function performed. For equipment that receives an analog voice signal, the analog signals must be converted to digitized speech, according to a defined procedure. Typically, speech is converted from analog to digital form using one of various well known standards, such as μ-law encoding. Additional processes or equipment will then process the digital speech samples to packetize them into a structured protocol frame or data unit. Such well known structures include ATM or IP, although other forms are possible. These packets may then be streamed out, using for example, the Real Time Protocol ("RTP") standard for speech.

Typically, VoIP processing involves receiving the speech data in a buffer, collecting the data until a packet can be formed, and then transmitting the packet out on an output port. Each of these steps requires a definite amount of time, although typically this is measured in the range of milliseconds ($1/1000$ of a second). The time that is required to receive the minimum number of speech bits on an input port and the time that is required to transmit them on an output port are a function of the transmission speeds for the input and output port respectively. Consequently, the transmit time delay is determined by the transmission medium, while the time that is required to packetize the speech is dependent on various factors, including the processor speed, load, buffer sizes, and the algorithms used. The processing speed can vary from vendor to vendor, and from equipment type to equipment type. Other aspects contributing to delay are involved.

Because of the fundamental nature of VoIP technology, the existence of delay can be more likely and more problematic in analyzing than in circuit switched technology. Specifically, circuit switched technology by its nature typically provides minimal transit delay once a circuit is established. On the other hand, VoIP technology can be sensitive to the instantaneous processing load, buffer utilization, and other factors that can effect various types of equipment differently in the network.

When ascertaining the overall delay, it is often the case that the delay of signal transfer between two points (whether it be in analog, digital (non-packetized) or packetized form) is well known in some cases or for some equipment (particularly circuit switched equipment), and not known for other cases or other equipment. However, if the overall delay is known, and certain sources of delay can be readily estimated or are otherwise measured, allowing determination of the delay due to the other elements. In this manner, it is possible to break down the problem of ascertaining the delay into smaller subsets, allowing the contributing delay to be determined for various types of equipment. Once the delay in known for each contributing processes or equipment, then appropriate engineering operations can be performed. These operations can involve creating a larger memory space, redefining certain processing priorities, or otherwise altering resource allocations in order to minimize delay where required.

Figure 1:
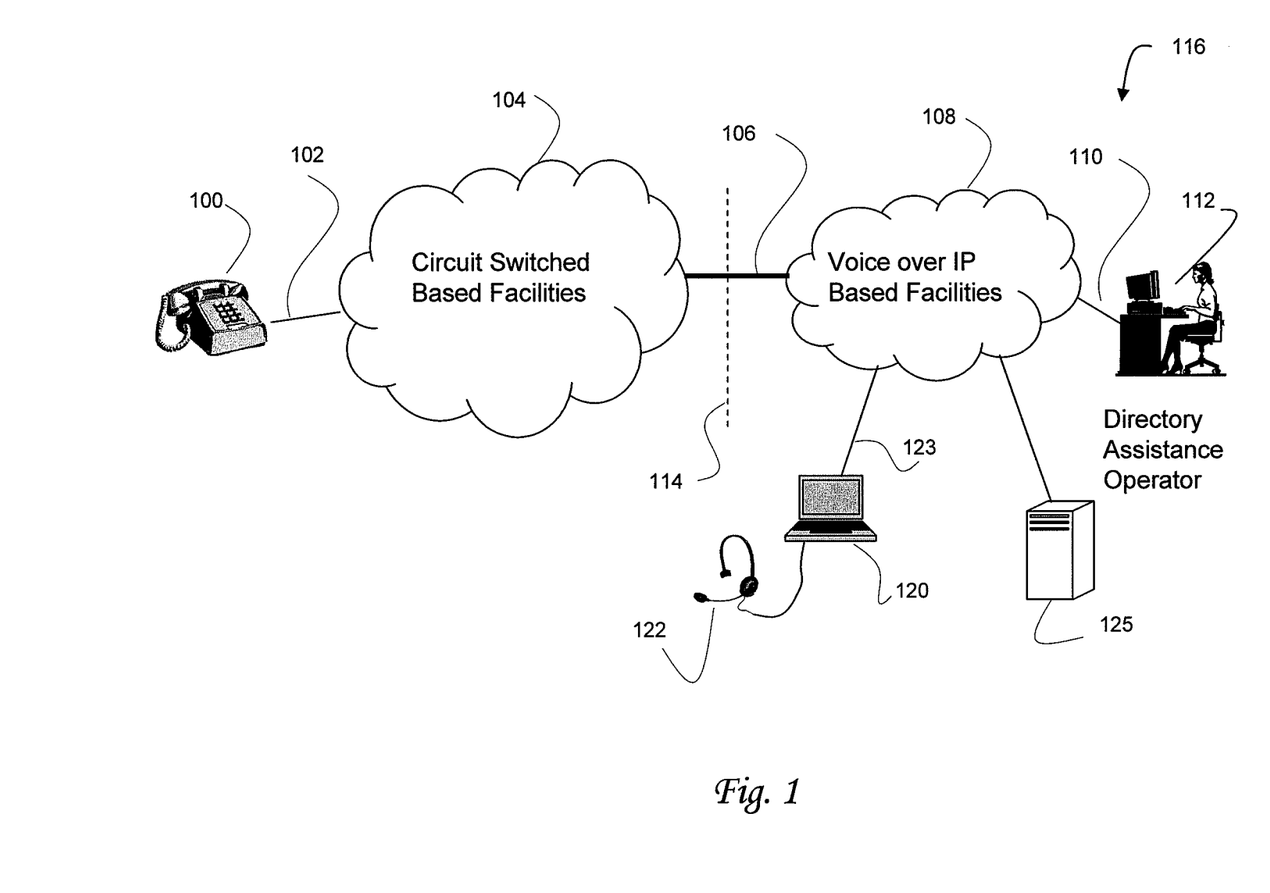
FIG. 1 illustrates one embodiment of the context of watermarking a VoIP packet streams in an environment for a telecommunications service.

One environment in which it is desirable to measure delay or provide informational tones/announcements is shown in FIG. 1. In FIG. 1, a communications environment is shown for providing various operator services. Operator services typically involve various specialized telephone company services that are provided to callers, which traditionally involve a human operator or agent. Although the present invention will be discussed in the context of directory assistance ("DA"), it can be used for other services, such as reverse charging, third party billing as well as other applications.

In exemplary embodiments of the present invention involved with providing DA service, a caller may request information regarding the telephone number of a person. The request can be implicit in dialing a dedicated number (such as "411" or "555-1212"). Typically, an automated system prompts the caller to enter a city and state, as well as the party's name, which provides a context for accessing a database (since many DA service providers furnish this information on a national basis). In various embodiments, the operator may or may not hear the prompt played to the caller. During this time, an operator is connected to the call to hear the caller's response. Once the operator hears the response, the operator can look up the desired telephone number, and connect the caller to an announcement machine which provides an automated announcement of the desired telephone number to the caller. The exact details of how the DA service can reflect various alternative embodiments of the invention that will be described in the context of interacting with an agent.

Turning to FIG. 1, a typically scenario involves a caller (not shown) located at a telephone 100, and connected via telephone facilities 102 to a carrier 104. The caller has placed a call to directory assistance using a defined telephone number associated with the service—e.g., such as "411" or "555-1212. Although FIG. 1 depicts a wireline-based caller, other embodiments may provide the service to wireless callers. Thus, a variety of service providers 104 (wireline or wireless) may contract to receive various operator services from an operator services provider 116. The operator services provider 116 in this example comprises the VoIP network 108 and the operator station 112. Other operator services providers may have other architectures.

The carrier 104 is shown in this embodiment as a circuit switched based provider, but other type of technologies may be used. Traditional circuit switched facilities still predominate in providing wireline services, and many service providers will contract out the provision of operator services, to third parties, particularly directory assistance. Other embodiments of the carrier 104 may also involve the use of VoIP facilities in whole or in part.

In this embodiment, the operator service provider 116 is partially or wholly utilizing VoIP technology. The VoIP technology is illustrated as involving a VoIP network 108, although it can be a mix of traditional circuit switched (digital or analog, or both) and VoIP technologies. In this embodiment, for sake of illustration, a homogenous VoIP environment 108 is shown. At a certain point 114, the speech being transferred from a non-VoIP network is converted into a packetized stream versus a non-packetized stream. In FIG. 1, the non-packetizing stream is associated with network 104 and the packetized stream is associated with network 108. The equipment performing this function is not shown in FIG. 1, but is often referred to as a gateway, and could be located in either network.

In the embodiment shown in FIG. 1, the VoIP network 108 can also used to provide telephone service (e.g., the operator services provider 116 can also be a telephony services provider). Thus, a caller could also originate the call for the operator service using a computer 120. In this case, the computer 120 is connected via headset 122 or other microphone/speaker arrangement, allowing the caller to make/receive telephone calls using a "VoIP" phone service. In this case, no gateway function in the network 108 is required. In essence, the gateway functionality of converting speech into VoIP packets is performed in the computer 120. As can be imagined, various other possible forms of interconnection are possible in which a VoIP call is received at the workstation 112.

An operator station 112 is shown that is connected to the VoIP facilities 108, typically using a LAN or other means of data connection 110. The workstation typically is based on a personal computer, or other commercially available processor-based workstation. Typically, the workstations comprise computers programmed for the specific application at hand. Thus, in some respects, the workstations 112 are similar to computer 120. It is presumed that the workstation 112 has an IP interface over the data connection 110 and is capable of processing VoIP packets, and has the appropriate means for providing audible signals and receiving sounds from the operator. The audible sound generation is typically accomplished using a headset or other speaker arrangement, including devices known as 'ear-pieces', ear-buds, headphones, headset, or other variations. The workstation also includes means for receiving speech from an operator, usually in the form of a microphone of some sort, which produces a signal which is then digitized and packetized. Quite often, the microphone and speaker are integrated into a headset, which is connected via a cord to the workstation.

Also shown in FIG. 1 is an automated voice response system 125, which may be used in the some embodiment to provide an initial announcement to the caller. This may be the initial greeting message, as well as the prompt to the caller, asking for which city and state the caller is requesting (e.g., the context). Typically, a switching device (which can be centralized) connects the voice response system 125, the workstation 112, and the caller in the network 108. In other embodiments, it is preferable that the announcements be provided by the workstation 112.

As discussed previously, when the operator workstation 112 in FIG. 1 is connected to a caller, there may be an absence of a noticeable click that the operator can use to determine that a caller is on line. While it is possible that a message may be displayed on the screen indicating a new caller is connected, this requires the operator to continually monitor the screen, which may be undesirable or difficult. Thus, an audible prompt indicating that a caller is now connected may be desirable.

Figure 2:
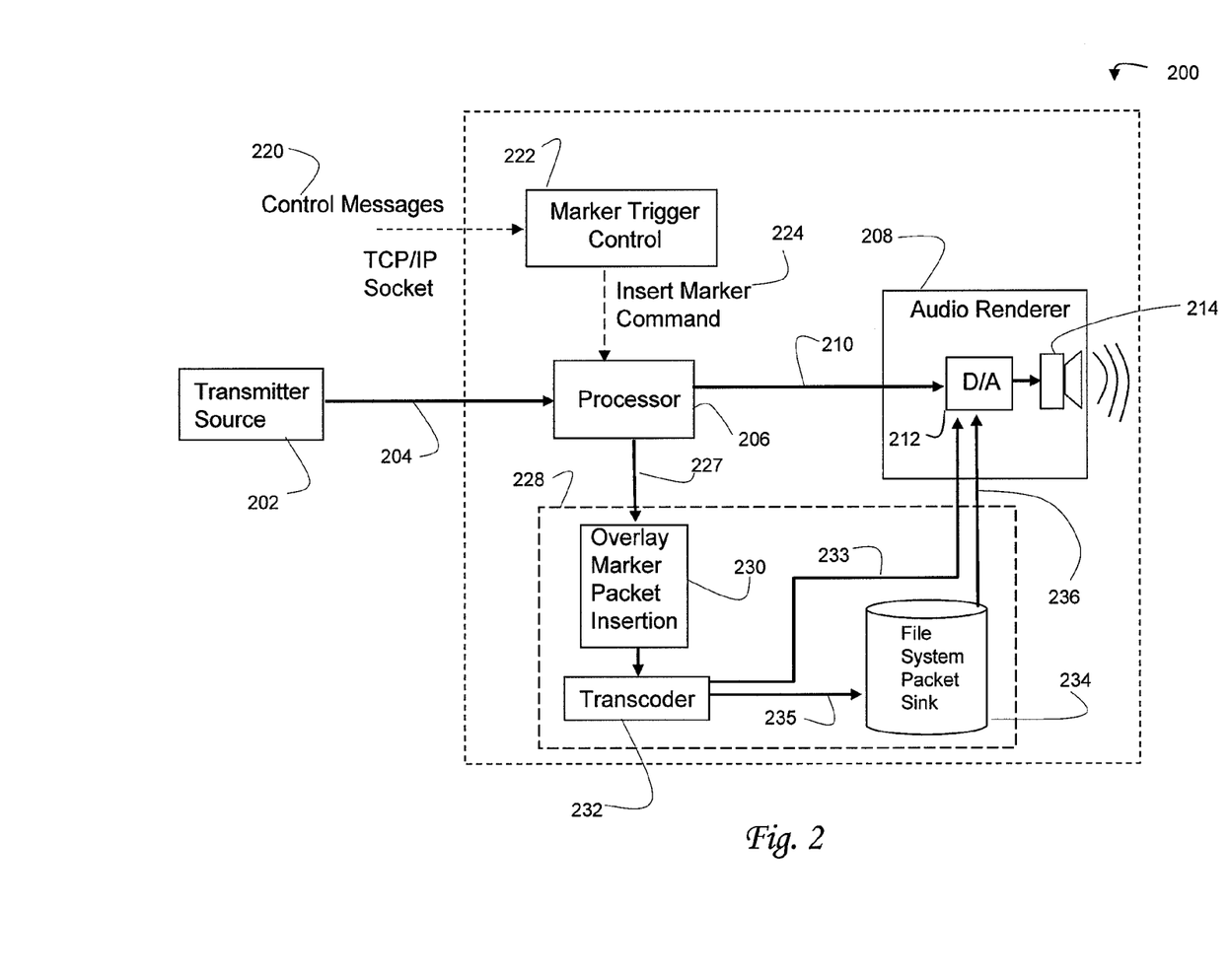
FIG. 2 illustrates a logical depiction of one embodiment for watermarking a speech packet stream in a VoIP environment for a telecommunications service.

The diagram shown in FIG. 2 can also be used to insert informational tones. Further, as will be seen, the basic arrangement shown in FIG. 2 can also be used to provide a greeting or announcement. When providing an informational tone (or announcement), the tone typically overwrites a brief section of the speech, or precedes the speech. The tone can be used to prompt or inform the agent that a caller is connected and is about to speaking, or is speaking. In this context, the direction of information flow is fundamentally being transmitted from a caller to an agent.

In FIG. 2, a workstation 200 is typically embodied in a computer or workstation adapted via software to provide directory assistance functions for an agent (not shown). Although the workstation comprises various well known components, including processor, memory, disk drives, monitors, etc., not all of these are shown in FIG. 2 (except for the processor). In FIG. 2, the workstations 200 comprises various functional processes and components, which are combined in the figure for convenience of illustration, and do not reflect the actual physical or logical embodiments. It is possible that the present embodiment may be altered and accomplished using one or more various processors operating in coordination or a plurality of software modules performing the various identified functions on a single processor.

The workstation 200 includes a processor 206 which can be either the main processor in the workstation, or a dedicated VoIP related processor, such as found in an 'add-on' board, which are often available for incorporation into a desktop computer by the owner of the workstation. The processor itself can be any of the well-known commercially available microprocessors. One function of the processor 206 is to receive and process VoIP packets received on an interface 204 from a transmitter source 202. In this embodiment, the transmitter source ultimately is the caller's speech that has been packetized by the gateway. As previously discussed, the packetization of speech can occur at different points, but in this example, it is presumed that VoIP packets are presented to the processor. Typically, the interface is a particular TCP/IP address (e.g., socket or otherwise established connection) using a standard VoIP streaming protocol, such as RTP (real time protocol). For most of the speech processing, the processor 206 performs the necessary processing in order to provide the digitized speech stream 210 to an audio renderer 208.

The audio renderer 208 is illustrated in this embodiment as comprising a digital-to-analog converter 212, which accepts the digital voice signals and generates an analog signal, which then is played via a speaker 214. Typically, an amplifier is utilized (which is not shown). The particulars of the audio renderer are not disclosed, as it is well known in the art.

Consequently, when a caller places a DA call, and provides voice signals for a particular city and state, the packets are generated at the appropriate transmitter source 202, over to an interface 204 to a processor 206, which then generates the appropriate digitized data stream 210 to the audio renderer 208, causing the agent to hear the caller's speech. At certain times, an indication is provided to the operator workstation indicating that a call is present, just prior to the caller's response. This indication is shown as control message 220 and results in the informational tone to be provided.

The control message 220 is provided as input to the workstation 200, and can be a proprietary protocol format, which the workstation is programmed to recognize. Consequently, the exact message format or syntax can be varied. It is generated by another system (not shown) that coordinates the distribution of DA calls to available agents. Typically, the control message is sent to a pre-established TCP/IP socket of a workstation of the corresponding selected agent. The TCP/IP socket is defined as for use in communicating such control messages.

The workstation has a process called "marker trigger control" 222 which parses the message, and determines that the processor is to be informed regarding the insertion of a watermark or marker.

The processor 206, which is executing a packet processing application (which is inherent in the depiction of the processor 206 in this embodiment and not shown as a separate process), receives the control message and invokes an overlay marker packet insertion procedure 230. In practice, this process 230 is a separate application or process executed on the processor 206, but is shown in FIG. 2 as a separate process because it is different from the main packet processing application. In other embodiments, the overlay marker packet insertion process could execute on a separate processor, or via dedicated hardware along with other functionality shown in box 228.

During the time when the insert marker command 224 indicates a marker should be inserted, there maybe incoming packets to the processor 206. In one embodiment, these packets simply overrun the buffer in the processor so that these incoming packets are 'dropped.' In other embodiments, the processor may buffer the incoming packets while the informational tone is being provided. In still another embodiment, the packets may be redirected along path 227 to the insertion process 230, which would buffer or discard the incoming voice packets.

The overlay marker packet insertion process 230 will insert packets corresponding to a certain informational tone. If there is only one tone, there is no need for the processor to indicate which tone to play. If there are various types of informational tone, then the processor will have to indicate which tone to select. These tones are represented by certain digital patterns which are stored in memory (not shown), which are packetized as appropriate.

Based on the embodiment, the tone packets may have to be transcoded. Transcoding refers to the process of coding from one digitized speech protocol or standard to another. The process is optional, and is shown in FIG. 2 for purposes of illustration. In one embodiment, the insertion of informational tone packets from the overlay marker packet insertion process 230 may result in the generation of μ-law encoded speech packets, whereas the workstation is configured to playing out speech in a different format (such as MPEG compressed speech format). In another example, the workstation may be able play out μ-law encoded speech packets, but transcodes the speech packets into MPEG for storage purposes (because the MPEG format requires less storage space, but requires more processing to compress the data). Thus, the transcoder 232 would transcode the μ-law encoded speech packets to the MPEG format if this required.

Once the audible packets are transcoded, the data signals are sent on path 233 to the audio renderer 208 for generation of an audible signal, which the agent then hears. In this embodiment, the trigger control 222 directs the processor 206 to provide the informational tone as long as the insert marker command 224 indicates such should be provided. Typically, the duration will be less than a second or two, which is sufficient for the agent to hear the tone and act accordingly. Once the trigger control 222 turns off the insert marker command, the voice packets 204 received by the processor 206 are processed as normal, and are sent as data over path 210 to the audio renderer. If there are no incoming speech packets at the processor, the processor would generate the appropriate data stream 210 to the audio renderer indicating silence.

Figure 3:
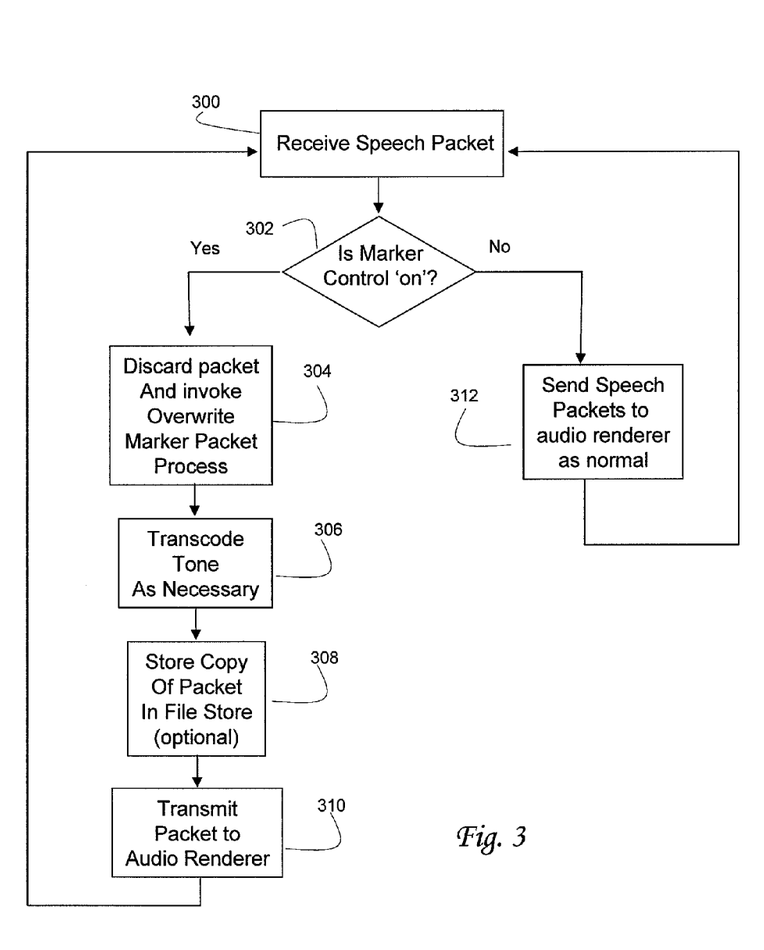
FIG. 3 illustrates one embodiment of the process for watermarking a speech packet stream in a VoIP environment in a VoIP environment.

A corresponding flow chart for this process is shown in FIG. 3. The process begins at step 300 when the processor 206 receives a speech packet. In this case, it is presumed that a speech packet in proper VoIP form is received at the processor. The processor first determines whether the marker control is "on" indicating whether the informational tone should be applied in step 302. If the result is "no", then the speech packet is sent to the audio renderer in step 312 for generating an audible speech signal as normal.

If however, the processor receives a marker insertion control signal, then step 304 occurs and the speech packet is discarded, which involves merely letting the input buffer be overwritten, effectively discarding the contents of the packet. In other embodiments, the packet may be forward to the marker insertion process where that process then discards the packet as necessary. At this point, the appropriate informational tone data is retrieved.

The next step occurs at step 306 where the informational tone data is transcoded if necessary. If so, then the appropriate conversion to the appropriate digital speech standard occurs. If no transcoding is required, then this step can be skipped.

The next step 308 is also optional and is shown as it may be present in other embodiments. As noted, it may be desirable to store the speech data (including the informational tone) in a file store. If so, this step may occur at this stage. More will be discussed regarding storage of the speech stream, as it impacts other aspects of the system operation.

The next step 310, involves transmitting the informational tone to the audio renderer, where the informational tone is played out to the agent. In some embodiments, the informational tone could actually be a 'whisper', which is a spoken word, prompting the agent with information about the caller. In various embodiments, the prompt could inform the agent that the caller is a customer with a certain characteristic, such as having a past due balance, a high valued customer, or a customer seeking a specific type of information, e.g., "sales" or "service."

The process then returns to step 300, where it repeats. If the indication that the tone is to be provided, then the incoming speech packets continue to be discarded and the tone is applied until the mark control signal is "off" in step 302. In this embodiment, the command signals acts as a gating function—e.g., when on, the informational tone is provided and when off, the informational tone is not provided. In other embodiments, the indication of the marker control may be a 'one-shot' signal which prompts the processor to provide a fixed tone for a defined duration. Thus, the marker control can be on for a short time, e.g., 10 ms, which causes a 750 ms tone to be generated.

In the exemplary embodiments discussed above, the markers inserted were of an audible nature. Specifically, they were intended to be heard by a human operator. They typically replace any contemporaneous speech input packets, and are played out to the agent to provide information about the call.

In certain embodiments, the speech information maybe desired to be recorded. Often, the recording involves storing more than just the informational tone itself, but also the subsequent speech from the caller. This can be accomplished with a slight modification to the operation of the embodiment disclosed in FIG. 2. Turning back to FIG. 2, the control message may not only indicate that a control message 220 should be inserted, but that the ensuing speech should be stored in a file as well. The marker trigger control command 224 essentially indicates to the processor to start/stop recording. The "start" recording indication also functions to indicate insertion of the informational tone of a fixed duration. This could be accomplished using a single message with various parameters, or different messages.

In FIG. 2, the processor 206 would invoke the overlay marker packet insertion as indicated before. The informational tone would be inserted by the overlay marker packet insertion process for a defined time period. Once this time period is over, the processor would forward the incoming speech packets to the overlay marker process, which would forward the packets to the transcoder 232, which would transcode the packets if necessary, and provide a copy of the packets to a connection 235 to a file system store 234. Note that this is in distinction compared to the prior process, where the processor resumed sending voice packets over path 210 to the audio renderer, after the informational tone was provided. In this embodiment, the processor directs the voice packets over path 227 until the control signal directs otherwise.

Once the packets are received by the file store, the packets are stored. Further, either the transcoder (or the file store 234) could provide a copy of the same packets to the audio renderer 208. In another embodiment, the transcoder may provide uncoded packets to the audio renderer for play out, and transcode the packets to compress them for storage. In this manner, the file system is storing the packets beginning with the informational tone and the subsequent speech packets, until a control message indicates that recording the speech packets is no longer to occur. In this manner, complete samples of the informational tone and subsequent speech are recorded for subsequent analysis in the file system.

It is evidence that variations of this process are possible. For example, the processor 206 previously discarded incoming packets while the informational tone was inserted. In one variation, the processor merely forward the voice packets to the overlay marker packet insertion process 230. The overlay marker packet insertion process has a buffer, and discards the speech packets as the informational tone is inserted, and automatically causes the transcoding and storage in the file store. The dotted line 228 indicates that the process of the overlay marker packet insertion process, the transcoder, and file store could be implemented on a separate workstation. The transfer of the packets (and control information if required) would occur over a connection 227, using a LAN or other high speed communication facility. In this manner, a central file store and transcoding facility could be used for a number of workstations.

Figure 4:
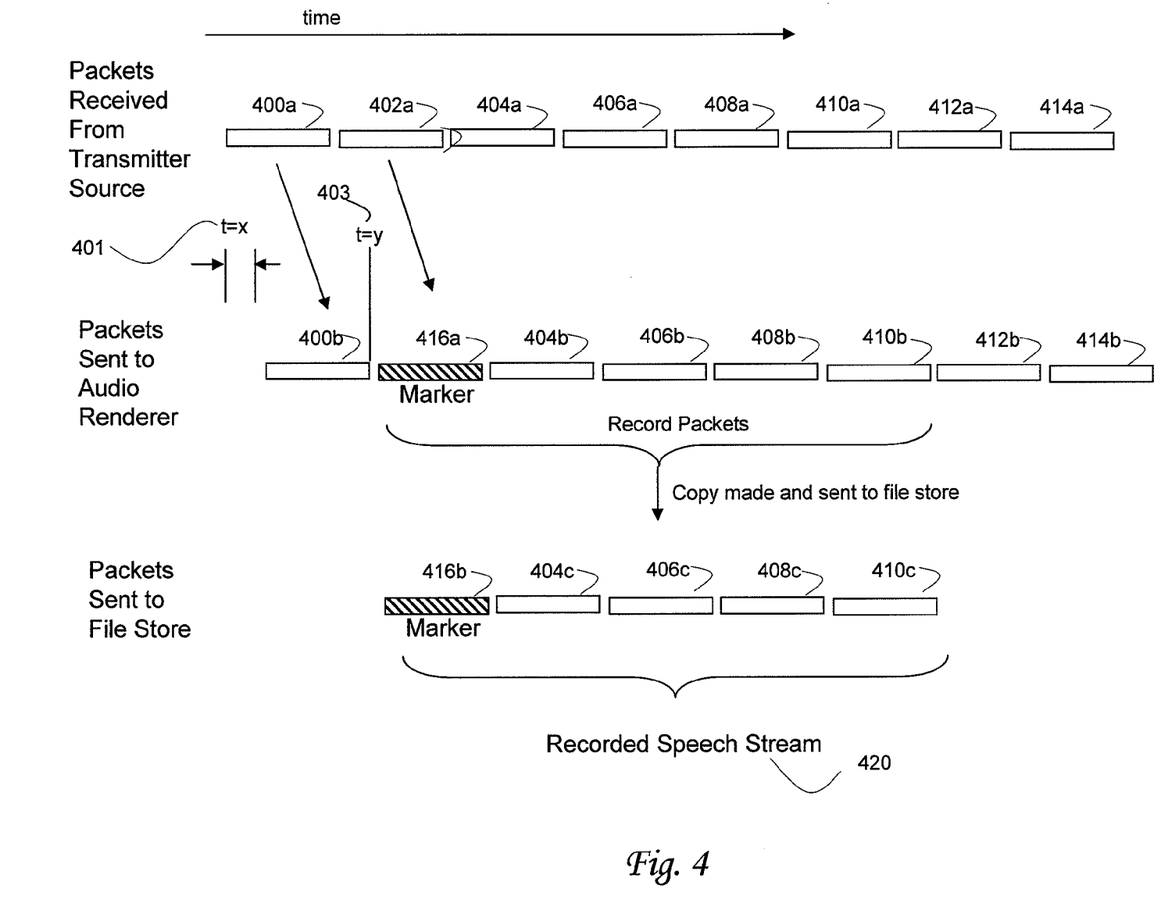
FIG. 4 illustrates one embodiment for various VoIP speech packets which are watermarked.

This process is illustrated further in FIG. 4. In FIG. 4, packets 400a-414a illustrate incoming packets to the processor 206 (FIG. 2). There is some minimal processing time delay shown as t=x 401 associated with the packets being processed. At t=y 403, the processor receives an indication to insert an audible marker, representing an informational tone or announcement.

Note that speech packet 402a was replaced with the marker packet 416a when the speech is forwarded to the audio renderer. Although this embodiment shows only one speech packet being replaced, other embodiments will replace several packets in a row. The impact to the agent's auditory experience is negligible, typically.

Further, a copy of the packets, beginning with the marker packet 416a are copied and sent to the file store. Thus, a copy of packet 416b is made (shown as 416c) and sent for recording in the file store. It is possible that the packets stored in the file store are first transcoded for compression, while those played out are not transcoded. At some later time (not shown) corresponding to the end of packet 410b, a control message is sent indicating that recording is to be stopped, and no further packets after 410c are recorded in the file store.

Consequently, the above scheme provides an easy way to audibly watermark a speech stream so that it can be easily identified and processed. For example, the recorded speech stream 420 is easily audibly identifiable using the beginning marker 416c as identifying the beginning of the speech segment and the remaining voice packets indicate the subsequent speech. Assuming a plurality of such speech streams are record, the next marker can delineate the end of the first stream. In this manner, various subsets of speech streams from a caller interacting with an agent can be recorded for security or work evaluation reasons. This can facilitate human comprehension on playback, as the audible marker provides a reference point for human comprehension with respect to the following speech. In essence, upon playback, the marker functions as a guidepost for the listener to begin paying attention, as the following speech represents the same audible signals are heard by the agent.

The above discussion focuses on examples of audible marker insertions or audibly watermarked. Typically, a portion of a digitized speech stream is replaced with a digital representation of an audible sound that is intended to be heard by an agent. The sound is designed to prompt the agent, or function as a listening 'guidepost' to facilitate the listening of the agent.

However, there are other applications in which watermarking of a speech stream is designed to facilitate 'listening' by a computer rather than a human (e.g., agent). In these applications, the purpose is to use the watermark to signal a starting point for measuring delay by a computer, or more specifically, by an application designed to measure delay. In such applications, the insertion of an audible tone would be difficult for an application to detect. This would require a speech recognition algorithm to detect the audible informational tone, which would present additional complexity. Thus, in such situations, a 'visual' marker would be used.

A visual marker is called such to distinguish it from an audible marker. It is not presently intended to be viewed per se, but represents a marker which is designed primarily to be detected by an automated process. The term 'visual' was originally coined since equipment (such as an oscilloscope) was used which displayed a waveform corresponding to the sounds conveyed by speech packets. The 'visual' marker when inserted, presents a "flat line" on the display, which was readily visible and distinguishable by human observation. Thus, the primary means of detecting the presence of the marker was not audible, but visual. However, many applications do not rely on service personnel using equipment for analyzing the marker, but rather rely on software programs that can easily detect an unexpected speech pattern (e.g., such as when all the digits in a voice stream are a digital "1"). Such an audible tone would normally not exist, and typically would not be distinguishable by a human even if it were reproduced into a sound. Thus, in summary, a visual marker is a watermark that is designed to be easily detected by software applications, and which is not intended to rely on a speech recognition process for detecting the watermark.

The visual marker can be used to measure delay, such as in the context of a directory assistance call. In a directory assistance call, the caller will hear a greeting, and then a voice prompt to enter the names of the city and state for which they are requesting information. Although the operator is connected to the caller at this point, the operator does not provide the greeting nor the prompt. Because of the repetitious nature of the prompt (e.g., "city and state, please"), automated voice prompts are used rather than having an operator repeat the prompt hundreds of times a day. The operator then waits for the caller to respond with the city and state.

During this time, there is a delay, which broken down in to roughly three time periods. First, there is the time delay associated with the announcement being played out, transmitted to the caller's telephone, and audibly played out. Second, the caller hearing the announcement, must formulate and state a response. Third, the caller's response must be transmitted from the caller's telephone to the agent's workstation. As noted in FIG. 1, the caller is often, though not required, to be connected to the PSTN.

Frequently, is it desirable to measure the overall delay, to obtain overall statistics on the delay and measure the performance of the network components, and the operators. Typically, the overall delay is measured, and the times for the various sub-portions can be estimated or derived. One embodiment of the present invention to measure delay is shown in FIG. 5.

Figure 5:
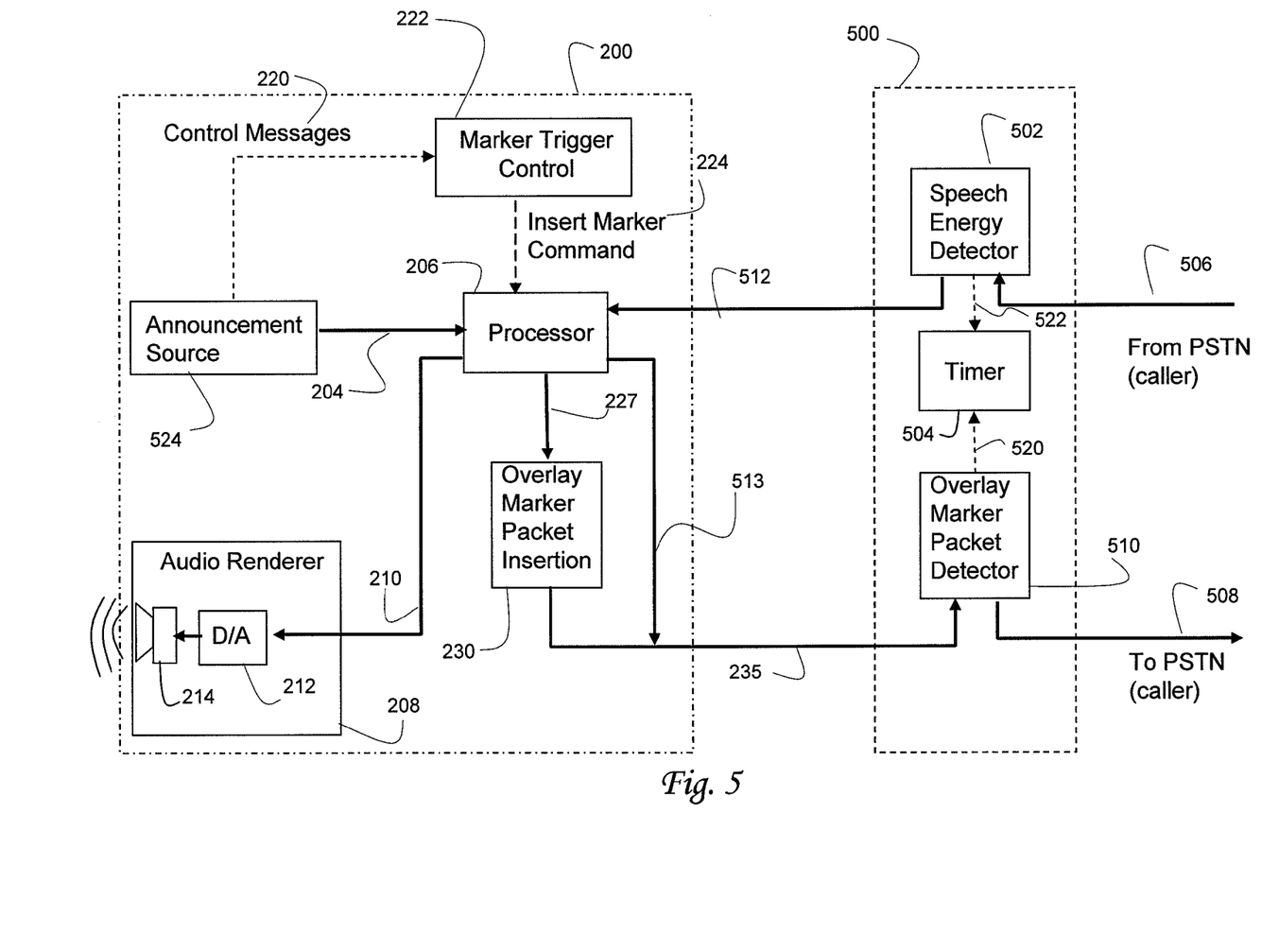
FIG. 5 illustrates one embodiment for measuring delay associated with a directory assistance call in a VoIP environment.

Turning to FIG. 5, the workstation 200 in this embodiment comprises the processor 206, the marker trigger control 222, the overlay marker packet insertion process 230, and the audio renderer 208 as discussed before. In this case, workstation also comprises an announcement source 524, which is a store of voice data representing the greeting and the prompt to the caller to enter the city and state.

In addition, there is a measurement entity 500, which measures the overall delay from the ending of the voice prompt to the time the caller responds. This is accomplished via a detector which detects the overlay marker packet 510 and a speech energy detector 502. These are used to start and stop a timer 504, which measures the desired duration.

The process is now described using FIG. 5. It is presumed that a caller from the PSTN has established a directory assistance call with the workstation. The workstation 200 will generate the greeting and the announcement using the announcement source 524. The voice data is sent over a connection 204 to the processor 206, which send the packets over path 513 which bypasses the overlay marker packet insertion process 230. The voice packets are sent on path 235 to the overlay marker packet detector 510, which monitors the packets for a visual marker. Essentially, the packets pass through the detector 510 with minimal delay to path 508, which plays the announcements to the caller.

When the announcement source plays the prompt message, a control message 220 is sent to the marker trigger control 222 to instruct that a visual marker packet should be inserted. This causes the insert marker command 224 to be sent to the processor 206. The insertion of the marker can occur at various points, depending on the delay to be measured. If the delay to be measured is from the beginning of the voice prompt, then the marker command is generated when the voice prompt is first sent from the announcement source 524 to the processor 206. If the delay to be measured is from the end of the voice prompt, then the marker command should be generated upon the completion of the voice prompt. As noted, the inclusion of a visual marker does not impact the audible nature of the announcement, so that it can be inserted at various locations without impacting the caller's audible experience.

In this embodiment, the marker is inserted just after the greeting and voice prompt are played. Upon receiving the insert marker command 224, the processor 206 will discard and substitute the voice packet with a marker packet. Because in this embodiment the marker is appended to the end of the prompt, there will not be any incoming packet to discard. Of course, if the control message 220 to the processor 206 is sent before the last voice packet is sent to the processor, then that last voice packet would be discarded. Alternatively, that last voice packet will be sent over path 227 to the overlay marker packet insertion process where it will be substituted with the visual marker. (In various embodiments, the incoming speech packet may be discarded in the processor, or in the overlay marker packet insertion process). The result is that the visual marker packet is sent from the overlay marker packet insertion process 230 over path 235.

The overlay marker packet detector 510 will detect the visual marker, which can be accomplished by matching the bit pattern of the payload. The detector 510 will send a signal 520 to the timer 504, indicating that a start of delay duration should be measured based on the detection of the marker. The marker packet is then forwarded by the detector over path 508 to the PSTN, and ultimately to the caller. In other embodiments, the detector may discard or record the visual marker packet.

After the caller hears the voice prompt, and responds appropriately, the response voice signals are received over path 506 at the speech energy detector 502. The speech energy detector detects the caller's speech, and is able to distinguish between this from other spurious background noise. Once speech is detected, the detector 502 sends a signal 522 to the timer, effectively indicating the end of the duration to be measured. The timer may also record other information, such as the time of day, agent position, etc. which facilitates various uses of the delay measurements.

The detector 502 passes the voice data to the processor over path 512, which then forwards the voice data of the caller over path 210 to the audio render, where the callers' speech is audibly played out to the agent.

This application of the invention can be implemented in various embodiments. In one embodiment, the delay timer function 500 is incorporated into the workstation. In other embodiments, the announcement source 524 can be external to the workstation. Various other configurations for implementing the processes can be defined. In still other embodiments, the speech packets may be recorded to memory with time stamp information for subsequent analysis of the duration.

As illustrated above, the watermark inserted is a visual type that can be used to mark a voice stream so as to delineate a point from which a delay measurement can be taken. The insertion of an audible watermark can be used to mark a voice stream so as to provide informational tones or insert or provide announcement information.

In some embodiments, the various combinations of the embodiments described above can coexist and be combined. For example, in one embodiments for providing directory assistance, the caller receives the initial greeting from using the principles of the present invention using an the announcement store in a workstation, which provides an audible watermark. Then, an inaudible watermark is used to measure delay associated with the caller.

It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

That which is claimed:

1. A method comprising:
    receiving, at a processor of a workstation, packetized voice data;
    replacing, by the processor, one or more packets of the packetized voice data with a marker packet to form a watermarked voice stream;
    forwarding, by the processor, the watermarked voice stream to an operator of the workstation; and
    storing, in a memory associated with the workstation, a copy of the watermarked voice stream, the storing the copy of the watermarked voice stream including:
        receiving, at the processor, an indication that recording of the watermarked voice stream should be stopped, and
        storing, in the memory and based on receiving the indication, the marker packet and a plurality of packets of the packetized voice data received prior to receiving the indication that recording should be stopped.

2. The method of claim 1, where the marker packet includes an audible marker.

3. The method of claim 1, where the marker packet includes a visual marker.

4. The method of claim 1, further comprising:
    receiving, at the processor, an indication to insert the marker packet, and
    the replacing including:
        replacing the one or more packets with the marker packet based on receiving the indication.

5. The method of claim 1, where storing the copy of the watermarked voice stream includes:
    transcoding the watermarked voice stream from a first protocol format to a second protocol format, and
    storing the transcoded watermarked voice stream.

6. The method of claim 1, where the marker packet includes an informational tone or announcement.

7. A system including:
    a processor to:
        receive packetized voice data, and
        replace one or more packets of the packetized voice data with a marker packet to form a watermarked voice stream;
    an audio renderer to:
        receive the watermarked voice stream,
        generate an audible signal representing the watermarked voice stream, and
        output the audible signal;
    a storage to:
        store a copy of the watermarked voice stream, and
        store packets of the watermarked voice stream received at the processor prior to an indication, received at the processor, to stop storing the packets of the packetized voice data.

8. The system of claim 7, where the marker packet includes an audible marker.

9. The system of claim 7, where the marker packet includes a visual marker.

10. The system of claim 7, where the processor is further to:
    receive an indication to insert the marker packet, and
    replace the one or more packets of the packetized voice data with the marker packet based on receiving the indication.

11. The system of claim 7, further comprising:
    a transcoder to transcode the watermarked voice stream from a first protocol format to a second protocol format, and
    where the storage is further to:
        store a copy of the transcoded watermarked voice stream.

12. A method comprising:
    detecting, by a packet detector, a marker in a voice stream;
    sending, by the packet detector and based on detecting the marker, a start signal to a timer to begin timing;
    forwarding, by the packet detector, the voice stream to a caller;
    receiving, at a speech detector, a voice response from the caller; and
    sending, by the speech detector, a stop signal to the timer to stop timing.

13. The method of claim 12, further comprising:
    determining a delay based on the start signal and the stop signal.

14. The method of claim 12, where the marker includes a visual marker.

15. The method of claim 12, where the marker includes a marker packet and where the voice stream includes packetized voice data.

16. The method of claim 15, further comprising:
    replacing one or more packets of the packetized voice data with the marker packet.

17. The method of claim 16, further comprising:
    replacing one or more packets at a beginning of the packetized voice data with the marker packet.

18. The method of claim 16, further comprising:
    replacing one or more packets at an end of the packetized voice data with the marker packet.

19. The method of claim 1, where replacing the one or more packets of the packetized voice data with the marker packet includes:
    transcoding the marker packet to form a transcoded marker packet, and
    replacing the one or more packets of the packetized voice data with the transcoded marker packet.

20. The system of claim 7, further comprising:
    a transcoder to transcode the marker packet to form a transcoded marker packet, and
    where, when replacing the one or more packets of the packetized voice data with the marker packet, the processor is to:
        replace the one or more packets of the packetized voice data with the transcoded marker packet.

* * * * *